(12) United States Patent
Shibata

(10) Patent No.: US 11,565,465 B2
(45) Date of Patent: Jan. 31, 2023

(54) METHOD FOR MANUFACTURING THREE-DIMENSIONAL SHAPED OBJECT, ADDITIVE MANUFACTURING APPARATUS, AND ARTICLE

(71) Applicant: CANON KABUSHIKI KAISHA, Tokyo (JP)

(72) Inventor: Naoari Shibata, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 281 days.

(21) Appl. No.: 16/201,399

(22) Filed: Nov. 27, 2018

(65) Prior Publication Data
US 2019/0176388 A1     Jun. 13, 2019

(30) Foreign Application Priority Data

Dec. 7, 2017  (JP) .............................. JP2017-235599
Nov. 9, 2018  (JP) .............................. JP2018-211542

(51) Int. Cl.
*B29C 64/245*     (2017.01)
*B29C 64/135*     (2017.01)
(Continued)

(52) U.S. Cl.
CPC .......... *B29C 64/135* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B29C 64/10; B29C 64/106; B29C 64/124; B29C 64/20; B29C 64/227; B29C 64/245;
(Continued)

(56) References Cited

U.S. PATENT DOCUMENTS

| 4,942,060 | A | | 7/1990 | Grossa |
| 5,198,159 | A | * | 3/1993 | Nakamura ............ B29C 64/135 |
| | | | | 365/107 |

(Continued)

FOREIGN PATENT DOCUMENTS

| CN | 1046613 A | 10/1990 |
| CN | 1849207 A | 10/2006 |

(Continued)

OTHER PUBLICATIONS

First Office Action in Chinese Application No. 201811468863.6 (dated Dec. 2020).

(Continued)

*Primary Examiner* — Joseph S Del Sole
*Assistant Examiner* — Margaret B Hayes
(74) *Attorney, Agent, or Firm* — Venable LLP

(57) ABSTRACT

A method for manufacturing a three-dimensional shaped object includes an $n^{th}$ layer forming step, an $n+1^{th}$ layer forming step, and a curing step. In the $n^{th}$ layer forming step, a cured portion of an $n^{th}$ layer, a first and second portions each of which is an uncured portion of the material are formed. In the $n+1^{th}$ layer forming step, a cured portion of an $n+1^{th}$ layer, and a third portion formed at a region adjacent to the cured portion of the $n+1^{th}$ layer and communicated with the first portion are formed. In the curing step, the second portion is cured prior to the $n+1^{th}$ layer forming step and the first and third portions are cured after the $n+1^{th}$ layer forming step, or the first, second and third portions are cured after the $n+1^{th}$ layer forming step.

7 Claims, 12 Drawing Sheets

(51) Int. Cl.
  *B33Y 30/00* (2015.01)
  *B33Y 50/02* (2015.01)
  *B33Y 10/00* (2015.01)
  *B29C 64/393* (2017.01)

(58) Field of Classification Search
  CPC ....... B29C 64/25; B29C 64/264; B29C 64/30; B29C 64/40; B33Y 50/00; B33Y 50/02
  See application file for complete search history.

(56) References Cited

U.S. PATENT DOCUMENTS

| | | | | |
|---|---|---|---|---|
| 5,209,878 | A * | 5/1993 | Smalley | B29C 64/393 |
| | | | | 264/401 |
| 5,474,719 | A * | 12/1995 | Fan | B29C 64/124 |
| | | | | 264/401 |
| 5,772,947 | A | 6/1998 | Hull et al. | |
| 6,051,179 | A * | 4/2000 | Hagenau | B33Y 50/02 |
| | | | | 264/401 |
| 6,711,451 | B2 * | 3/2004 | Hastert | B29C 64/106 |
| | | | | 700/119 |
| 6,730,256 | B1 * | 5/2004 | Bloomstein | G03F 7/0037 |
| | | | | 430/324 |
| 7,931,851 | B2 | 4/2011 | Ueno | |
| 8,057,731 | B2 | 11/2011 | Abe | |
| 9,227,365 | B2 | 1/2016 | Dikovsky et al. | |
| 10,427,354 | B2 * | 10/2019 | Dikovsky | G06F 30/17 |
| 2009/0267269 | A1 * | 10/2009 | Lim | B29C 64/135 |
| | | | | 264/401 |
| 2014/0055744 | A1 * | 2/2014 | Wildsmith | B29C 64/129 |
| | | | | 351/159.74 |
| 2015/0190965 | A1 * | 7/2015 | Okamoto | C09D 11/40 |
| | | | | 428/195.1 |
| 2016/0107383 | A1 | 4/2016 | Dikovsky et al. | |
| 2016/0339602 | A1 * | 11/2016 | Kato | B29C 64/165 |
| 2016/0375635 | A1 * | 12/2016 | Tomuta | B33Y 80/00 |
| | | | | 264/255 |
| 2017/0239886 | A1 * | 8/2017 | Norikane | C08F 290/067 |
| 2018/0029299 | A1 * | 2/2018 | Aknin | B33Y 10/00 |
| 2018/0059541 | A1 * | 3/2018 | Campbell | B33Y 80/00 |
| 2018/0200945 | A1 * | 7/2018 | Ochi | B29C 64/209 |
| 2018/0291199 | A1 * | 10/2018 | Miyake | B33Y 70/00 |
| 2018/0311893 | A1 * | 11/2018 | Choi | B29C 64/20 |
| 2018/0339397 | A1 * | 11/2018 | Redfield | B29C 64/129 |
| 2018/0370125 | A1 * | 12/2018 | Rolland | B29C 64/129 |

FOREIGN PATENT DOCUMENTS

| | | |
|---|---|---|
| CN | 101309766 A | 11/2008 |
| CN | 103025506 A | 4/2013 |
| JP | 8-118479 A | 5/1996 |
| JP | 10-119136 A | 5/1998 |
| JP | 2004-122501 A | 4/2004 |
| JP | 2018-47556 A | 3/2018 |

OTHER PUBLICATIONS

Notice of Reasons for Refusal in Japanese Application 2018-211542 (dated Oct. 2022).

* cited by examiner

METHOD FOR MANUFACTURING THREE-DIMENSIONAL SHAPED OBJECT, ADDITIVE MANUFACTURING APPARATUS, AND ARTICLE

BACKGROUND OF THE INVENTION

Field of the Invention

The present invention relates to a method for manufacturing a three-dimensional shaped object, an additive manufacturing apparatus, and an article.

Description of the Related Art

Along with the improvement of shaping speed and shaping accuracy, additive manufacturing apparatuses are now being used to manufacture not only trial products and mockup models but also certain types of mass production products such as parts of vehicles and railway vehicles. In three-dimensional shaping adopting a lamination system, after curing one layer of shaping material, an adjacent layer of shaping material is supplied to a surface of the cured layer and cured to form the adjacent layer, by which the three-dimensional shaped object is manufactured.

Japanese Patent Application Laid-Open Publication No. H10-119136 discloses a method of shaping a portion having a fine shape such as a screw thread by adopting a shallow curing depth while shaping a solid portion corresponding to an axial core portion of a screw by adopting a deep curing depth and increasing the lamination thickness. Japanese Patent Application Laid-Open Publication No. H10-119136 discloses that the shaping time is reduced as a result of this method.

A three-dimensional shaped object manufactured using an additive manufacturing apparatus adopts a lamination structure, so that interfaces are formed between respective adjacent layers. Therefore, rigidity of the three-dimensional shaped object being manufactured was low since interlayer adhesion was low and separation tended to occur at the interfaces. Even according to the method disclosed in Japanese Patent Application Laid-Open Publication No. H10-119136, the rigidity of the solid portion was increased but separation still tended to occur at the interface between the solid portion and the solid portion, such that the rigidity of the three-dimensional shaped object was still low.

SUMMARY OF THE INVENTION

According to a first aspect of the present invention, a method for manufacturing a three-dimensional shaped object by solidifying a shaping material, the method includes an $n^{th}$ layer forming step of forming a cured portion of an $n^{th}$ layer (n being a natural number of 2 or greater) by curing the shaping material, a first portion which is an uncured portion of the shaping material at a region adjacent to the cured portion of the $n^{th}$ layer, and a second portion which is an uncured portion of the shaping material at a region adjacent to the cured portion of the $n^{th}$ layer and communicated with an uncured portion of an $n-1^{th}$ layer, an $n+1^{th}$ layer forming step of forming a cured portion of an $n+1^{th}$ layer at a region adjacent to the second portion by curing the shaping material, and forming a third portion at a region adjacent to the cured portion of the $n+1^{th}$ layer and communicated with the first portion which is the uncured portion of the shaping material, and a curing step of curing the second portion prior to the $n+1^{th}$ layer forming step and curing the first and third portions after the $n+1^{th}$ layer forming step, or curing the first, second and third portions after the $n+1^{th}$ layer forming step.

According to a second aspect of the present invention, an additive manufacturing apparatus configured to form a three-dimensional shaped object using a shaping material, the apparatus includes a control unit, and a curing unit configured to cure the shaping material based on control of the control unit. The control unit is configured to control the curing unit to execute an $n^{th}$ layer forming process of forming a cured portion of an $n^{th}$ layer (n being a natural number of 2 or greater), a first portion which is an uncured portion of the shaping material at a region adjacent to the cured portion of the $n^{th}$ layer, and a second portion which is an uncured portion of the shaping material at a region adjacent to the cured portion of the $n^{th}$ layer and communicated with the uncured portion of an $n-1^{th}$ layer, an $n+1^{th}$ layer forming process of forming a cured portion of an $n+1^{th}$ layer at a region adjacent to the second portion by curing the shaping material, and forming a third portion at a region adjacent to the cured portion of the $n+1^{th}$ layer and communicated with the first portion which is the uncured portion of the shaping material, and a curing process of curing the second portion prior to the $n+1^{th}$ layer forming process and curing the first and third portions after the $n+1^{th}$ layer forming process, or curing the first, second and third portions after the $n+1^{th}$ layer forming process.

Further features of the present invention will become apparent from the following description of exemplary embodiments with reference to the attached drawings.

DESCRIPTION OF THE EMBODIMENTS

Now, an embodiment for carrying out the present invention will be described in detail with reference to the drawings. In the following description, a three-dimensional shaped object refers not only to a finished product but also to a semi-finished product in which shaping is performed to a mid-layer among the plurality of layers.

First Embodiment

Figure 1:
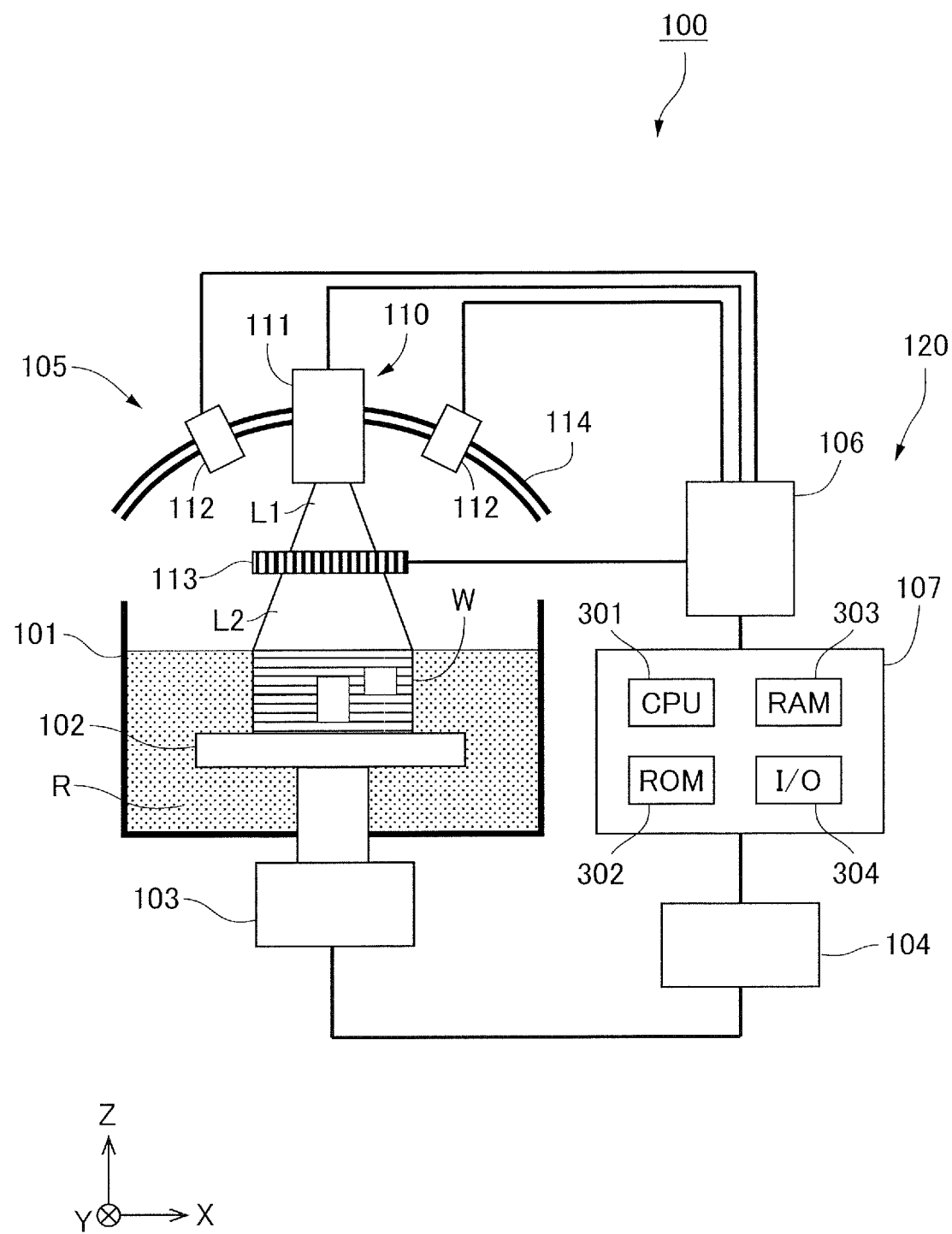
FIG. 1 is a simplified diagram illustrating an additive manufacturing apparatus according to a first embodiment.

FIG. 1 is a simplified diagram illustrating an additive manufacturing apparatus 100 according to a first embodiment. The additive manufacturing apparatus 100 is a 3D printer that adopts optical shaping to manufacture a three-dimensional shaped object W. The additive manufacturing apparatus 100 includes a vessel 101 that stores photocuring resin R in liquid state, which serves as an example of a material (a shaping material, 3D printing material) to form a three-dimensional shaped object, a printing table 102, a drive unit 103 that drives the printing table 102, and a drive controller 104 that controls the drive unit 103. Further, the additive manufacturing apparatus 100 includes an exposure unit 105 that serves as an example of a curing unit, and an exposure controller 106 that controls the exposure unit 105. Further, the additive manufacturing apparatus 100 includes an apparatus controller 107 that controls the whole apparatus. The drive controller 104, the exposure controller 106 and the apparatus controller 107 constitute a control system 120 that serves as an example of the control unit. The additive manufacturing apparatus 100 according to the present embodiment adopts a subsidence system in which the printing table 102 is lowered while the shaping material is shaped.

The photocuring resin R in liquid state stored in the vessel 101 is a resin in a liquid state that is cured, i.e., solidified, if light of a specific wavelength region is irradiated thereto, and according to the present embodiment, the resin is cured by UV light (ultraviolet light). Various types of resin, such as acrylic resin and epoxy resin, can be used as the material of the photocuring resin R, but acrylic resin is preferable.

The apparatus controller 107 is composed of a computer including a CPU 301, a ROM 302, a RAM 303 and an I/O 304. The CPU 301 controls the whole apparatus by sending commands and data to the drive controller 104 and the exposure controller 106 based on a control program stored in advance in the ROM 302 and the like. Also, in the present embodiment, ROM 302 is a non-transitory computer readable medium configured to store data used in the additive manufacturing apparatus configured to form a three-dimensional shaped object (article) by laminating a plurality of layers.

The printing table 102 is arranged in an interior of the vessel 101 and capable of moving in a Z direction, that is, a vertical direction or up-down direction. The drive unit 103 includes a motor such as a stepping motor and a mechanism such as a feed screw mechanism for converting a rotational motion of the motor into linear motion, and moves the printing table 102 in the Z direction. The drive controller 104 controls the drive unit 103 based on a command from the apparatus controller 107.

The exposure unit 105 includes a light source unit 110 serving as a light source member and composed of a light source 111 and a spot light source 112, a liquid crystal panel 113, and a rail 114 for adjusting the position and posture of the spot light source 112.

The light source 111 is configured to irradiate ultraviolet light L1 to a wide area. The liquid crystal panel 113 includes a plurality of cells arranged in a matrix in X- and Y-directions, which are two horizontal directions orthogonal to the Z direction, and the liquid crystal panel 113 is arranged between the light source 111 and the printing table 102 so that ultraviolet light L1 is irradiated to a plurality of cells. The liquid crystal panel 113 may be omitted, and if the liquid crystal panel 113 is omitted, ultraviolet light L1 is irradiated selectively by adopting an exposure element such as DLP as the light source 111. The spot light source 112 irradiates ultraviolet light in a spotlight-like manner. Both light sources 111 and 112 are capable of controlling optical intensity of the ultraviolet light being irradiated.

The exposure controller 106 drives the light source 111 and the spot light source 112 to emit light and controls the amount of transmission of light transmitted through each cell of the liquid crystal panel 113, so that the photocuring resin R on the printing table 102 is exposed to a desired pattern of ultraviolet light L2.

In a state where ultraviolet light L2 of a pattern corresponding to a layer of the three-dimensional shaped object W is irradiated to the photocuring resin R in liquid state, the photocuring resin R at the irradiated portion is cured, and the cured object corresponding to one layer of the three-dimensional shaped object W is formed on the printing table 102. Then, the drive unit 103 lowers the printing table 102 for a distance corresponding to one layer, and the adjacent layer of the cured object is laminated sequentially to form the three-dimensional shaped object W.

Figure 2:
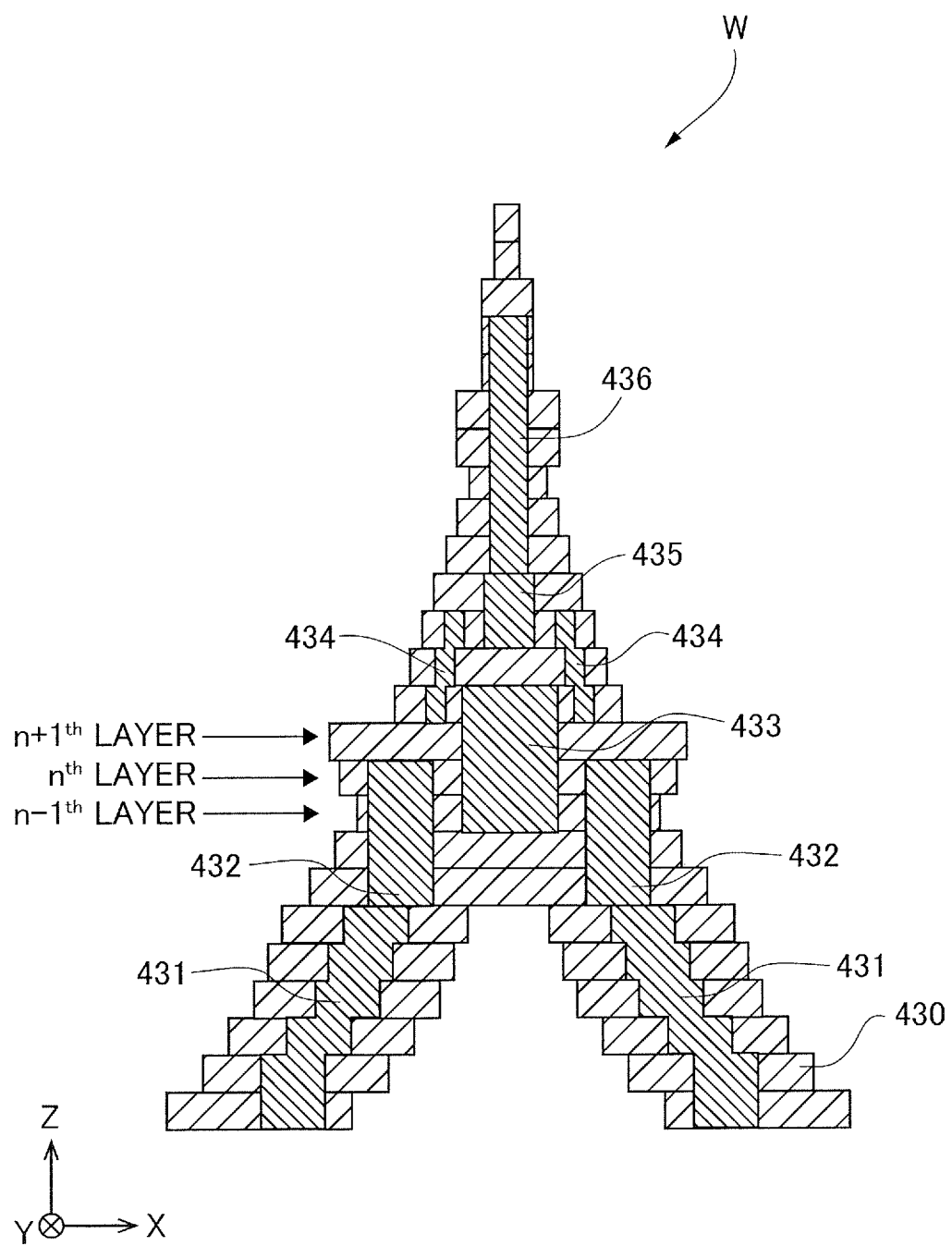
FIG. 2 is a cross-sectional view illustrating one example of a three-dimensional shaped object that is manufactured by a manufacturing method according to the first embodiment.

FIG. 2 is a cross-sectional view illustrating one example of the three-dimensional shaped object W manufactured according to a manufacturing method described later. The three-dimensional shaped object W illustrated in FIG. 2 is, for example, a tower-type shaping material in which a top portion is tapered. Since the additive manufacturing apparatus 100 adopts a subsidence system, the three-dimensional shaped object W is shaped from the bottom layer upward by sequentially laminating the cured objects.

The three-dimensional shaped object W includes a lamination portion 430 composed of cured objects which are cured one layer at a time and laminated in the Z direction, i.e., lamination direction, and a plurality of seamless portions 431 through 436 which are formed of cured objects extending across a plurality of successive layers in the Z direction. Specifically, for example, if an arbitrary layer is referred to as an $n^{th}$ layer, the $n^{th}$ layer forms a cured portion of the n$^{th}$ layer, wherein n is a natural number of two or greater. Along therewith, a first portion 433, which is an adjacent region of the cured portion of the n$^{th}$ layer and serving as an uncured portion of the shaping material, and a second portion 432, which is an adjacent region of the cured portion of the n$^{th}$ layer and serving as an uncured portion of the shaping material that is communicated with an uncured portion of an n−1$^{th}$ layer, are formed (n$^{th}$ layer forming step, n$^{th}$ layer forming process).

After the n$^{th}$ layer forming step, n+1$^{th}$ layer is formed subsequently by curing the shaping material to form a cured portion of the n+1$^{th}$ layer to an adjacent region of the second portion 432 serving as the uncured portion of the n$^{th}$ layer. Along therewith, a third portion 433, which is an adjacent region of the cured portion of the n+1$^{th}$ layer and serving as an uncured portion of the shaping material communicated with the first portion 433 serving as the uncured portion of the n$^{th}$ layer, is formed (n+1$^{th}$ layer forming step, n+1$^{th}$ layer forming process).

These steps are repeated to form the lamination portion 430 serving as the cured portion and the seamless portions 431 through 436 which are uncured portions. The lamination portion 430 serving as the cured portion and the seamless portions 431 through 436 which are uncured portions are formed of the same material. Since a plurality of seamless portions 431 through 436 are formed, the respective seamless portions 431 through 436 function as a wedge, by which interlayer adhesive force of the lamination portion 430 is enhanced.

Among the plurality of seamless portions 431 through 436, two seamless portions 432 and 433 are deviated in the Z direction, and parts of the two seamless portions 432 and 433 are arranged at the same positions in the Z direction. By arranging a portion of the seamless portion 432 and a portion of the seamless portion 433 to be overlapped in the Z direction, adhesive force of the layers including the interface of the seamless portion 432 in the Z direction and the layers adjacent thereto is increased by the seamless portion 432 functioning as a wedge. Similarly, adhesive force of the layers including the interface of the seamless portion 433 in the Z direction and the layers adjacent thereto is increased by the seamless portion 432 functioning as a wedge. Since parts of the two seamless portions 432 and 433 are formed at the same positions in the Z direction, the seamless portions will function as a wedge, such that interlayer adhesive force of the lamination portion 430 is increased and rigidity of the three-dimensional shaped object W is thereby increased.

Similarly, parts of the two seamless portions 433 and 434 are formed at the same positions in the Z direction, and parts of the seamless portions 434 and 435 are also formed at the same positions in the Z direction. Therefore, interlayer adhesive force of the lamination portion 430 can be increased by the seamless portions functioning as wedge, and rigidity of the three-dimensional shaped object W is thereby increased. Specifically, as illustrated in FIG. 2, if an arbitrary layer is referred to as the n$^{th}$ layer, the n$^{th}$ layer includes a first portion (433) that has no boundary between the n+1$^{th}$ layer and a second portion (432) that has no boundary between the n−1$^{th}$ layer and has a boundary between the n+1$^{th}$ layer.

In the three-dimensional shaped object W, interfaces are formed between cured objects constituting the respective layers of the lamination portion 430 and between the lamination portion 430 and the seamless portions 431 through 436, as illustrated in FIG. 2. Whether a boundary is formed at the interface is confirmed by cutting the shaping material and observing the cross-sectional surface thereof. If a boundary is not observed visually, the cross-sectional surface is observed using an electron microscope, and if a line is observed between the layers, it is confirmed that a boundary, or interface, is formed. There are cases where there are no interfaces, that is, where interfaces disappear during the manufacturing process. Even if interfaces have disappeared in the three-dimensional shaped object W, during the manufacturing process, the lamination portion 430 is formed by being laminated layer by layer, and the seamless portions 431 through 436 are respectively formed collectively.

In the following description, a method for manufacturing the three-dimensional shaped object W according to the present embodiment will be described in detail. The apparatus controller 107 transmits a command to the drive controller 104, the drive controller 104 having received the command drives the drive unit 103 according to the command, and the drive unit 103 drives the printing table 102 to move in the up-down direction, that is, the Z direction. Therefore, it is assumed in the description that the apparatus controller 107 of the control system 120 controls the printing table 102. Further, the apparatus controller 107 transmits a command (including slice data described later) to the exposure controller 106, and the exposure controller 106 drives the light source 111, the spot light source 112 and the liquid crystal panel 113 based on the command. Therefore, it is assumed in the description that the apparatus controller 107 of the control system 120 controls the light source 111, the spot light source 112 and the liquid crystal panel 113.

At first, the apparatus controller 107 creates a plurality of data, i.e., slice data, acquired by dividing the three-dimensional shape data of the three-dimensional shaped object W entered in advance into thin layers of certain lamination pitch, i.e., layer thickness, such as 30 [μm]. The respective data of the plurality of data are created to indicate cured portions and uncured portions of the plurality of thin layers. The apparatus controller 107 divides the region corresponding to each slice data into a first region serving as a cured portion and a second region serving as an uncured portion. Specifically, each layer is divided into a first region serving as a cured portion in which photocuring resin R is cured, and a second region serving as a portion in which the photocuring resin R is cured collectively across a plurality of successive layers in the Z direction (if the layers are cured one layer at a time, the second region may be referred to as an uncured portion). The first region corresponds to the lamination portion 430 of FIG. 2. The second region corresponds to the seamless portions 431 through 436 of FIG. 2. That is, each of the plurality of layers in FIG. 2 is formed by irradiating light and curing the photocuring resin based on slice data, and the position viewed upward from the lower portion of FIG. 2 is the position in which the light is irradiated. Specifically, the slice data of the n$^{th}$ layer which is one of the plurality of layers includes two uncured portions, first and second portions 433 and 432, which are portions where light is not irradiated or light weaker than that irradiated on the cured portion is irradiated. At least a part of the uncured portions is positioned at the same position as the uncured portion of the slice data of the n+1$^{th}$ layer. At least a part of the second portion is positioned at the same position as the uncured portion of the slice data of the n−1$^{th}$ layer and also at the same position as the cured portion of the slice data of the n+1$^{th}$ layer. The first region and the second region are set by an operator through use of an input apparatus not shown.

FIGS. 3A, 3B, 3C, 4A, 4B, 4C, 5A and 5B are drawings illustrating a method for manufacturing the three-dimensional shaped object W according to the first embodiment. In the following description, layers are merely defined for easier understanding of the manufacturing process, and the actual manufactured three-dimensional shaped object W is not necessarily composed of layers.

Figure 3A:
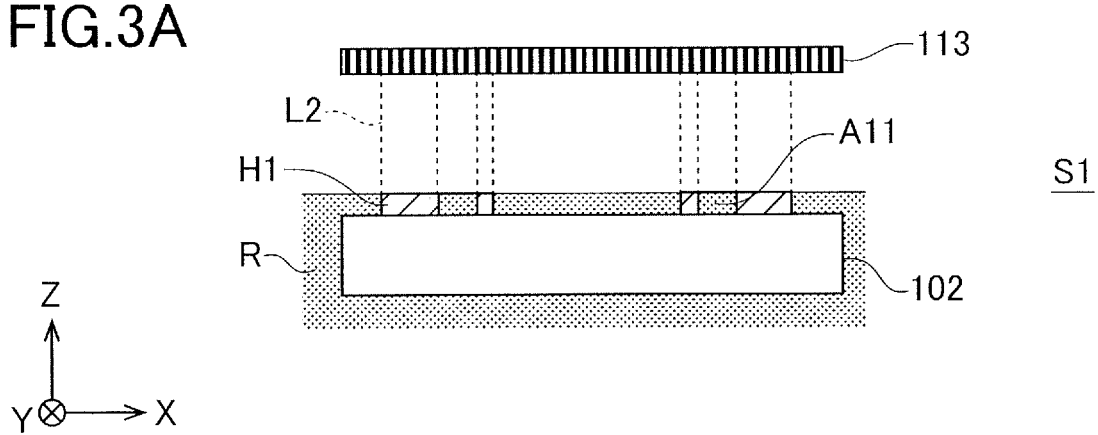
FIG. 3A is an explanatory view of a method for manufacturing a three-dimensional shaped object W according to the first embodiment.

At first, as illustrated in FIG. 3A, the printing table 102 is subsided for a depth corresponding to a thickness of one layer from the surface of the photocuring resin R in liquid state in the vessel 101 of the apparatus controller 107. The apparatus controller 107 drives the light source 111 to emit light, drives the liquid crystal panel 113 so that ultraviolet light L2 is only transmitted to a first region corresponding to the first layer of the lamination portion 430 (FIG. 2), and causes ultraviolet light L2 to be irradiated to the photocuring resin R. In the present embodiment, not all regions of the photocuring resin R corresponding to the slice data of the first layer are cured, but only the photocuring resin R of the first region is cured by irradiation of ultraviolet light L2. Thereby, a cured object H1 defining a partial region A11 of the first layer in region A1 (FIG. 3C) and constituting a part of the lamination portion 430 (FIG. 2) is formed.

Figure 3B:
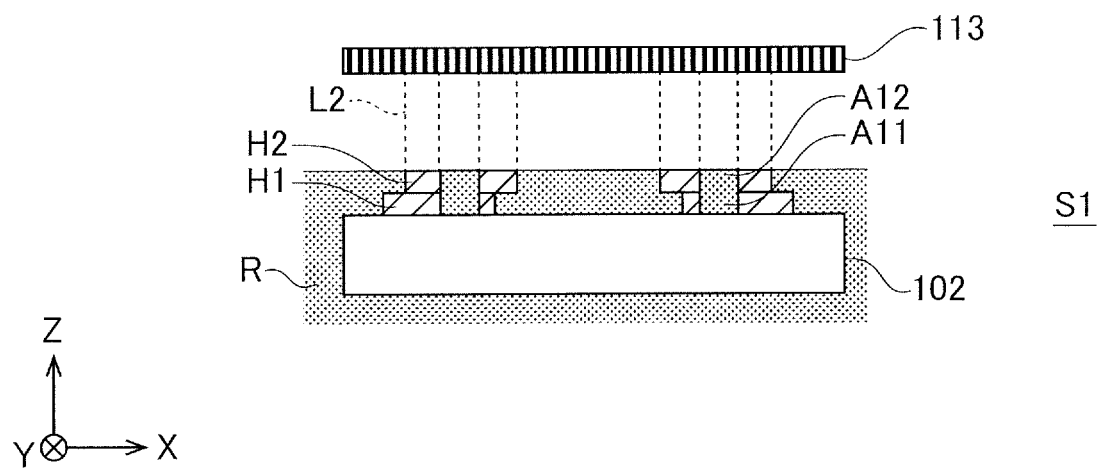
FIG. 3B is an explanatory view of the method for manufacturing a three-dimensional shaped object W according to the first embodiment.

Next, as illustrated in FIG. 3B, the apparatus controller 107 controls the printing table 102 to subside further for a depth corresponding to a thickness of one layer. Photocuring resin R in liquid state flows in from the surrounding area onto the cured object H1 formed on the printing table 102. The apparatus controller 107 drives the light source 111 to emit light, drives the liquid crystal panel 113 so that ultraviolet light L2 is only transmitted to a first region corresponding to the second layer of the lamination portion 430 (FIG. 2), and causes ultraviolet light L2 to be irradiated to the photocuring resin R. In the present embodiment, not all regions of the photocuring resin R corresponding to the slice data of the second layer are cured, but only the photocuring resin R of the first region is cured by irradiation of ultraviolet light L2. Thereby, a cured object H2 defining a partial region A12 of the second layer in region A1 (FIG. 3C) and constituting a part of the lamination portion 430 (FIG. 2) is formed.

Figure 3C:
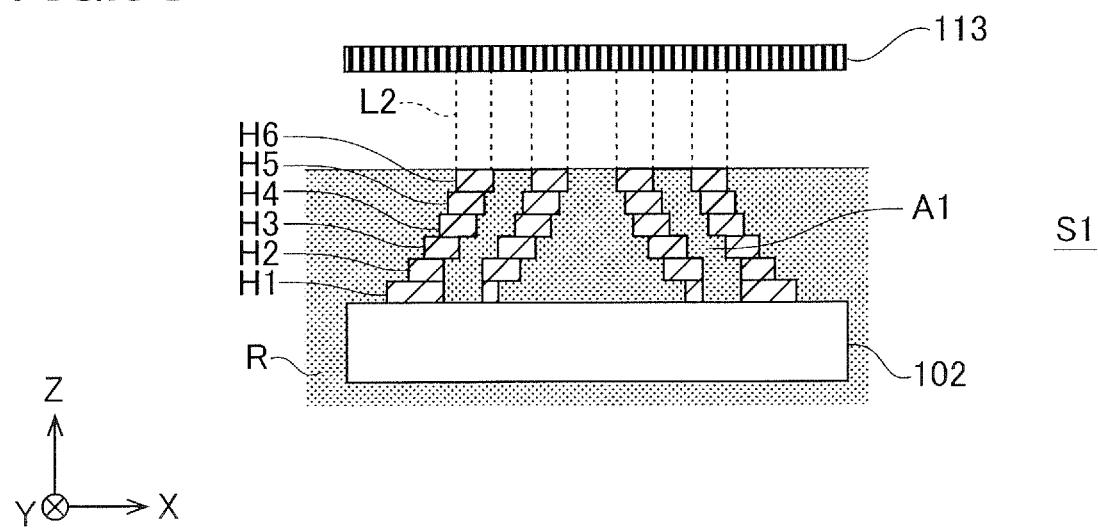
FIG. 3C is an explanatory view of the method for manufacturing a three-dimensional shaped object W according to the first embodiment.

By performing the above process to form a plurality of layers, as illustrated in FIG. 3C, cured objects H1 through H6 formed by curing a plurality of layers of photocuring resin R define a region A1 that is extended across a plurality of successive layers in the Z direction and where curing of photocuring resin R is not completed. At this point of time, an upper surface of region A1 is opened, and the photocuring resin R positioned at region A1 may be exposed to light.

Figure 4A:
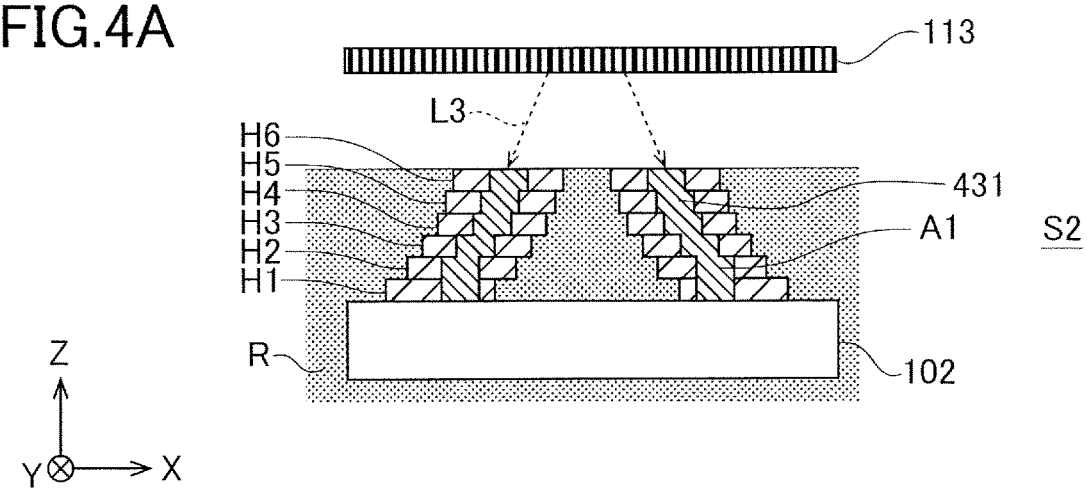
FIG. 4A is an explanatory view of the method for manufacturing a three-dimensional shaped object W according to the first embodiment.

Next, as illustrated in FIG. 4A, the apparatus controller 107 drives the spot light source 112 to emit light and irradiate ultraviolet light L3 to the photocuring resin R positioned at region A1. In this state, the apparatus controller 107 adjusts the direction of ultraviolet light L3 irradiated to the photocuring resin R positioned at region A1, that is, the position and posture of the spot light source 112, according to the shape of the region A1. Further, the apparatus controller 107 drives the liquid crystal panel 113 so that ultraviolet light L3 from the spot light source 112 is transmitted through the liquid crystal panel 113. The apparatus controller 107 collectively cures photocuring resin R positioned at region A1 for a depth corresponding to a plurality of layers by irradiating ultraviolet light L3 having stronger intensity than the intensity of ultraviolet light L2 irradiated to define the region A1 to the photocuring resin R positioned at region A1. Thereby, a seamless portion 431 extending across a plurality of layers of cured objects H1 through H6 is formed in region A1.

Figure 4B:
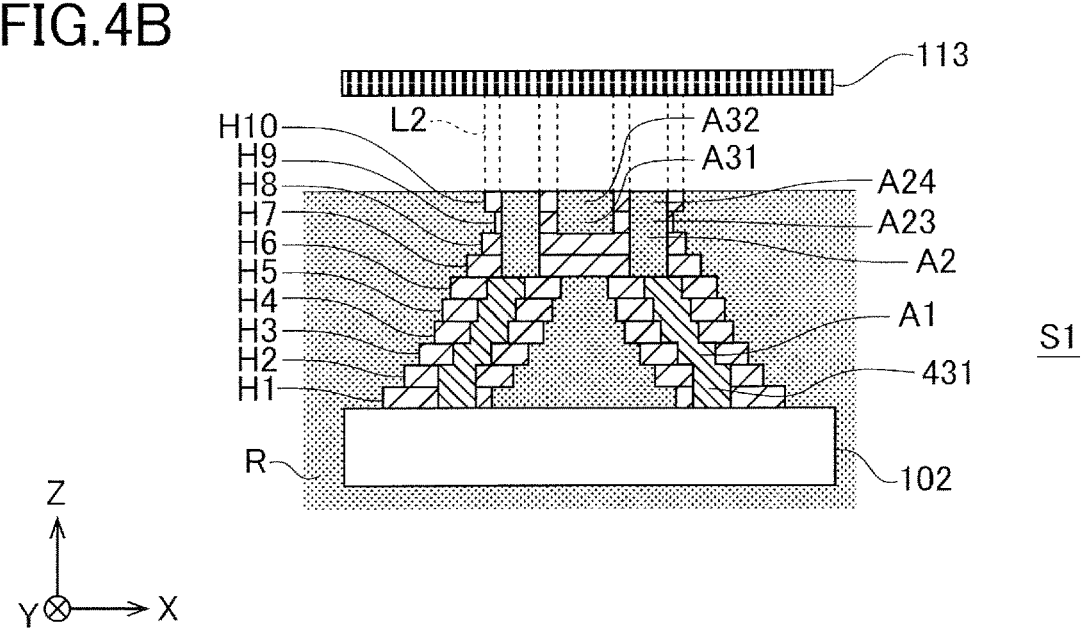
FIG. 4B is an explanatory view of the method for manufacturing a three-dimensional shaped object W according to the first embodiment.
Figure 4C:
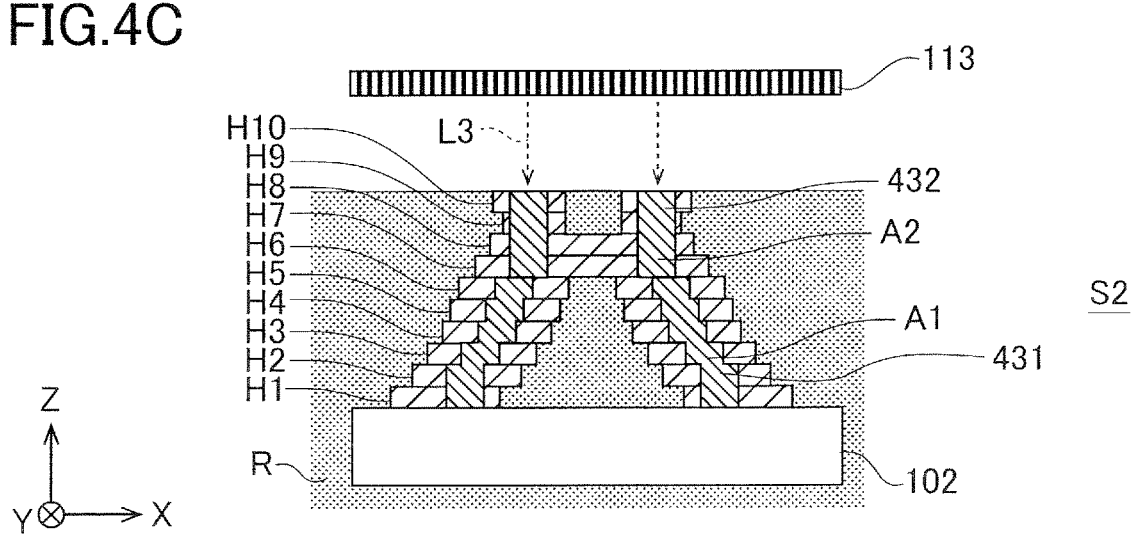
FIG. 4C is an explanatory view of the method for manufacturing a three-dimensional shaped object W according to the first embodiment.

Further, as illustrated in FIG. 4B, a whole region A2 corresponding to a seamless portion 432 is defined by forming cured objects H7 through H10 on the seventh to tenth layers. Then, as illustrated in FIG. 4C, the apparatus controller 107 adjusts the position and posture of the spot light source 112, drives the spot light source 112 to emit light, and irradiates ultraviolet light L3 to the photocuring resin R positioned at region A2. Thereby, the seamless portion 432 extending across a plurality of layers of cured objects H7 through H10 is formed in region A2.

As illustrated in FIG. 4B, in the ninth and tenth layers, cured objects H9 and H10 define not only partial regions A23 and A24 of region A2 corresponding to the seamless portion 432 but also partial regions A31 and A32 of region A3 (FIG. 5A) corresponding to the seamless portion 433. In order to cure the photocuring resin R in region A2, as illustrated in FIG. 4C, the apparatus controller 107 drives the liquid crystal panel 113 so that the light from the spot light source 112 is not irradiated to the partial regions A31 and A32.

Figure 5A:
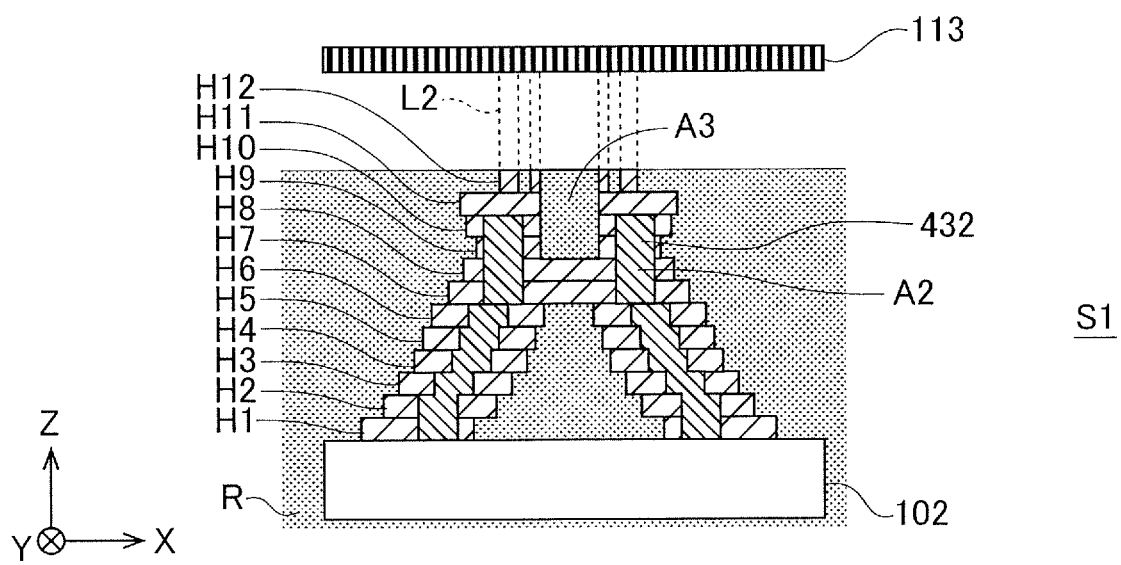
FIG. 5A is an explanatory view of the method for manufacturing a three-dimensional shaped object W according to the first embodiment.
Figure 5B:
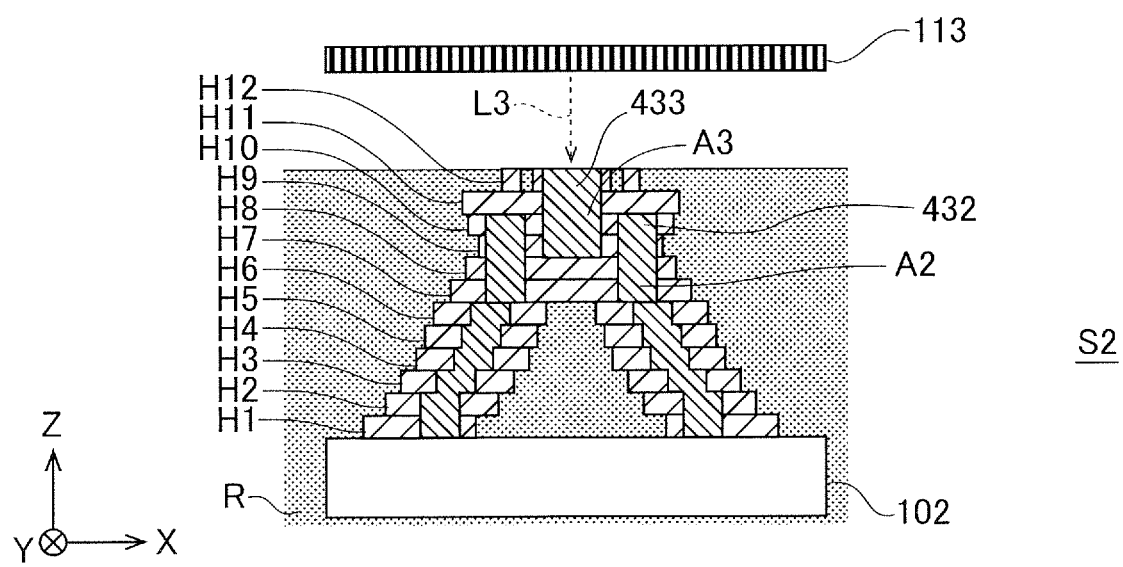
FIG. 5B is an explanatory view of the method for manufacturing a three-dimensional shaped object W according to the first embodiment.

As illustrated in FIG. 5A, the whole region A3 corresponding to the seamless portion 433 is defined by forming cured objects H11 and H12 of the eleventh and twelfth layers. Then, as illustrated in FIG. 5B, the apparatus controller 107 adjusts the position and posture of the spot light source 112, drives the spot light source 112 to emit light, and irradiates ultraviolet light L3 on the photocuring resin R positioned at region A3. Thereby, the seamless portion 433 extending across a plurality of layers is formed in region A3.

As described, the photocuring resin R is cured layer by layer in the Z direction, while defining a plurality of regions (regions A1 through A3 in the example illustrated in FIGS. 3A through 3C, 4B and 5A) that extend across a plurality of successive layers in the Z direction by the cured objects (S1: first step, first process). Region A1 is defined by cured objects H1 through H6, region A2 is defined by cured objects H7 through H10, and region A3 is defined by cured objects H9 through H12. Then, in step S1, the photocuring resin R is cured and cured objects H9 and H10 are formed such that two regions A2 and A3 are defined in a deviated position in the Z direction and parts of the two regions A2 and A3 are defined at the same positions (ninth and tenth layers) in the Z direction.

Further, as illustrated in FIGS. 4A, 4C and 5B, photocuring resin R positioned at the respective regions A1, A2 and A3 are cured collectively (S2: second step, second process, curing step, curing process). In the present embodiment, in step S2, photocuring resin R positioned at the respective regions A1 through A3 are independently cured each time the definition of each region A1, A2 and A3 is completed. By curing the photocuring resin R of the respective regions A1 through A3 before the respective regions A1 through A3 are sealed by the cured object, it becomes possible to manufacture the three-dimensional shaped object W without leaving an uncured or half-cured resin in the interior of the object W even if the cured object is made of a material having low transmittance of ultraviolet light. In other words, in the curing step of the present embodiment, the second portion is cured prior to the n+1$^{th}$ layer forming step and the first and third portions are cured after the n+1$^{th}$ layer forming step.

By repeatedly executing the above-described processes, the three-dimensional shaped object W illustrated in FIG. 2 is manufactured. The three-dimensional shaped object W manufactured as described includes seamless portions 431, 432 and 433 that function as wedges positioned at regions A1, A2 and A3.

As described, by collectively curing the photocuring resin R of the respective regions A1 through A3 in step S2, formation of interfaces in the respective regions A1 through A3 can be prevented, and rigidity of the three-dimensional shaped object W can be enhanced. Further, two seamless portions 432 and 433 that are deviated in the Z direction but partially overlapped in the Z direction are formed by defining the two regions A2 and A3, the rigidity of the three-dimensional shaped object W can be enhanced.

Now, as illustrated in FIG. 3C, region A1 is defined inside the cured objects H1 through H6 that are formed by curing photocuring resin R. Further, as illustrated in FIG. 4B, region A2 is defined inside the cured objects H7 through H10 that are formed by curing photocuring resin R. Further, as illustrated in FIG. 5A, region A3 is defined inside the cured objects H9 through H12 that are formed by curing photocuring resin R. That is, the portion constituting an outer shape of the three-dimensional shaped object W is formed highly accurately by cured objects H1 through H12. Then, in the steps illustrated in FIGS. 3C, 4B and 5A, the photocuring resin R in the regions A1, A2 and A3 is in an uncured state, the photocuring resin R is held by cured objects H1 through H6, cured objects H7 through H10 and cured objects H9 through H12, and thereby prevented from being flown out.

Further, for example, it is preferable to define region A1 so that two adjacent layers in region A1 extended across a plurality of layers are overlapped in a range of 25% or greater and 100% or smaller in area ratio when viewed from direction Z. The same applies for regions A2 and A3. This overlap of layers enables the successiveness of the respective seamless portions to be maintained at the respective seamless portions 431, 432 and 433 and enhance the rigidity of the three-dimensional shaped object W.

A case has been described in which exposure of step S1 illustrated in FIG. 3C and exposure of step S2 illustrated in FIG. 4A are performed separately, but they may also be performed at the same time. Similarly, the exposure of step S1 illustrated in FIG. 4B and the exposure of step S2 illustrated in FIG. 4C may be performed at the same time. Similarly, the exposure of step S1 illustrated in FIG. 5A and the exposure of step S2 illustrated in FIG. 5B may be performed at the same time.

Further, if a cross-sectional size of exposure of the three-dimensional shaped object W is close to the exposure pixel pitch and it is difficult to form a plurality of seamless portions to be overlapped at the same layer, it may be possible to arrange the seamless portions without displacing the seamless portions, or to not arrange the seamless portions. For example, in the three-dimensional shaped object W illustrated in FIG. 2, it is difficult to arrange the seamless portions 431 and 432 in an alternate manner in the Z direction at areas having small cross-sectional areas, such as at the leg portions. Further, since the area above the seamless portion 435 is tapered, it is difficult to arrange the seamless portions 435 and 436 in an alternate manner in the Z direction. Therefore, in such areas, the seamless portions should be arranged in the manner as illustrated in FIG. 2.

Further according to the three-dimensional shaped object W having a tapered shape, such as a tower-shaped object as illustrated in FIG. 2, the cross-sectional area is reduced toward the top, and it becomes difficult to form a large seamless portion. In such case, the cross-sectional area of the seamless portion in the X-Y direction should be reduced, but it is preferable for the cross-sectional area of the seamless portion to be 10% or greater of the whole cross-sectional area of the three-dimensional shaped object W cut in the X-Y direction.

Since the cross-sectional area of the three-dimensional shaped object W is reduced toward the upper direction, the respective seamless portions 431 through 436 are shaped to correspond to the shape of the three-dimensional shaped object W. Therefore, the direction of ultraviolet light L3 should be adjusted to correspond to the shape of the regions of the respective seamless portions 431 through 436, that is, to correspond to the shapes of the respective regions. For example, if ultraviolet light L3 is irradiated to region A1 formed in an inclined manner, the direction of the ultraviolet light L3 should be adjusted to correspond to the inclination of the shape of the region A1 with respect to the vertical direction.

Figure 6:
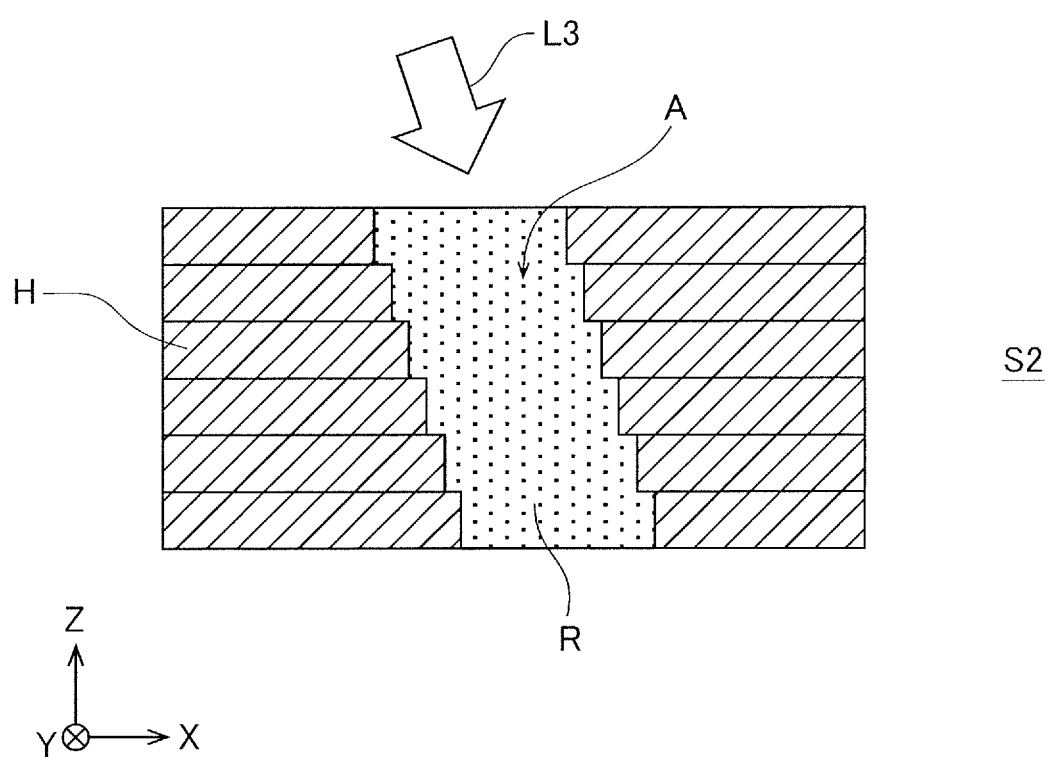
FIG. 6 is an explanatory view of a direction for irradiating light according to the first embodiment.

FIG. 6 is an explanatory view illustrating a direction of irradiation of ultraviolet light L3 according to the first embodiment. The position of region A in the X-Y direction defined by the cured object H differs in each layer. In such case, if ultraviolet light L3 is irradiated from directly above, the area in the shadow of the cured object H will not be exposed to ultraviolet light L3. Therefore, as illustrated in FIG. 6, ultraviolet light L3 may be irradiated to the whole area of region A by adjusting the direction of irradiation of ultraviolet light L3.

Second Embodiment

Now, a second embodiment will be described. According to the first embodiment described above, the photocuring resin R positioned at region A1 is set to uncured state in step S1, and curing is performed collectively in step S2, but the present invention is not restricted thereto. According to the second embodiment, photocuring resin R positioned at region A1 is not set to an uncured state, but instead, set to semi-cured state in step S1. For example, while curing one layer of photocuring resin R for defining region A1 in step S1, light having a weaker intensity than the intensity for forming cured objects H1 through H6 to define region A1 should be irradiated to the photocuring resin R positioned at region A1 of the same layer. That is, in step S2, the seamless portion 431 is formed by curing the area extending across a plurality of layers collectively, and especially in a case where UV-curing resin is used, dark reaction advances even if weak light is irradiated, and the resin may be gradually cured. Therefore, in step S1, light should be irradiated while restricting exposure intensity to correspond to the property of the material. The seamless portion 431 is taken as an example for description, but the same applies for the other seamless portions 432 through 436.

Figure 7A:
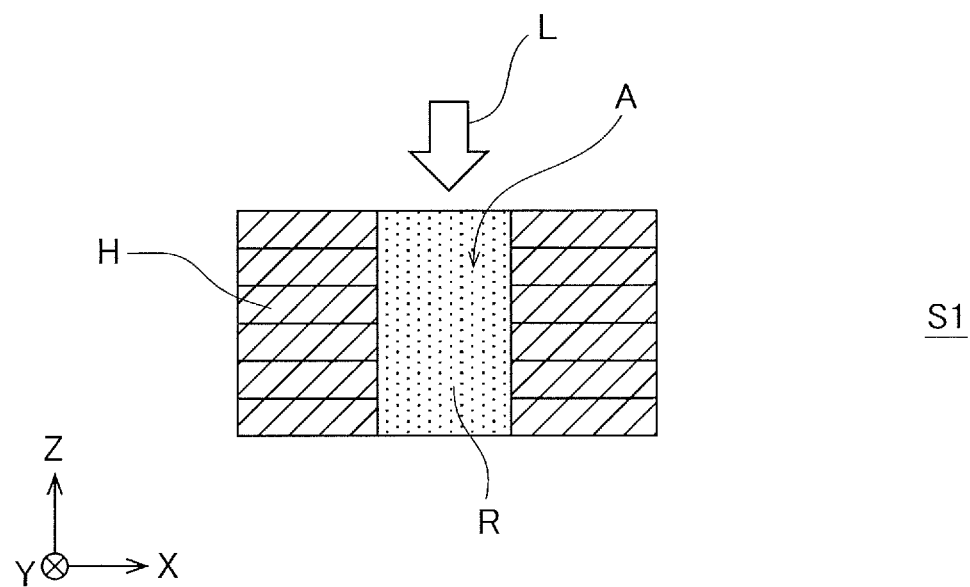
FIG. 7A is an explanatory view of a method for manufacturing a three-dimensional shaped object according to a second embodiment.

FIG. 7A is an explanatory view of step S1 according to the second embodiment. In step S1, each time a cured object H of the respective layers is formed, ultraviolet light L having a light quantity corresponding to approximately 10% reaction rate is irradiated uniformly in the X-Y direction to the photocuring resin R positioned at region A defined by the cured object H.

Curing of photocuring resin R of the respective layers in region A is gradually advanced by dark reaction and becomes semi-cured. By performing the same process for each layer in a state where photocuring resin R in region A maintains fluidity, a continuous seamless semi-cured portion can be acquired. With respect to such semi-cured portion, if curing is performed collectively for a suitable number of layers in step S2 while considering the ultraviolet light transmission rate of the photocuring resin R material, the continuously formed semi-cured portion can be cured at once. Curing of the lower layer portions where ultraviolet light cannot reach easily has been advanced by dark reaction than the upper layer portions, so that the whole area can be cured in a short time.

Further, if the photocuring resin R is semi-cured in step S1, region A defined by the cured object H is not restricted to the inner side of the cured object H, and it can be defined on the outer side of the cured object H, that is, exposed to the exterior. Then, in step S2, the semi-cured portion within the region can be cured collectively.

Third Embodiment

Now, a third embodiment will be described. In the second embodiment described above, a case has been described where the intensity of ultraviolet light L irradiated on the photocuring resin R is set uniformly in the X-Y direction while semi-curing the photocuring resin R positioned at region A in step S1. In the third embodiment, intensity of ultraviolet light irradiated on the photocuring resin R positioned at region A is adjusted to be more intense in a stepped configuration, or successively, as it approaches the boundary of region A in the X-Y direction.

Figure 7B:
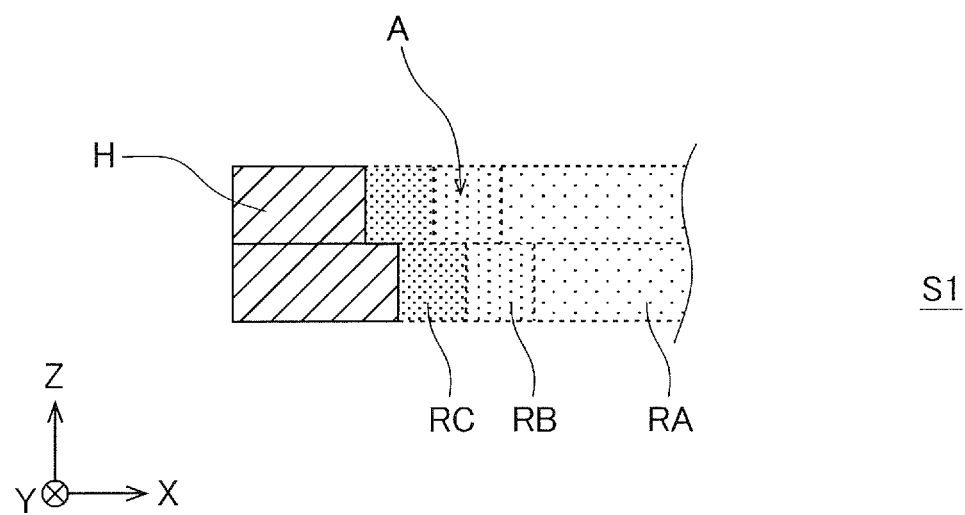
FIG. 7B is an explanatory view of a method for manufacturing a three-dimensional shaped object according to a third embodiment.

FIG. 7B is an explanatory view of step S1 according to a third embodiment. In region A defined by the cured object H, the amount of exposure may be gradually increased in stepped configuration or successively, for example, so that the curing reaction rate increases from 5%, 10% to 15%, toward the cured object H in the X-Y direction, to form semi-cured resin RA, RB and RC. Thereby, the boundary between the cured object H and region A can be broadened, and collective curing performed in step S2 may further enhance the mechanical rigidity of the shaping material.

An example has been described of a case where the intensity of ultraviolet light is increased in steppe configuration or successively toward the boundary of region A in the X-Y direction, but this arrangement may also be adopted in the Z direction, i.e., lamination direction, instead of the X-Y direction. Even in that case, the mechanical rigidity of the shaping material may be increased.

Fourth Embodiment

Now, a fourth embodiment will be described. In the first to third embodiments described above, an example has been described where photocuring resin R positioned at the respective regions A1 through A3 are cured individually in step S2 each time regions A1 through A3 extending across a plurality of layers are defined in step S1, but the present invention is not restricted thereto.

Figure 8:
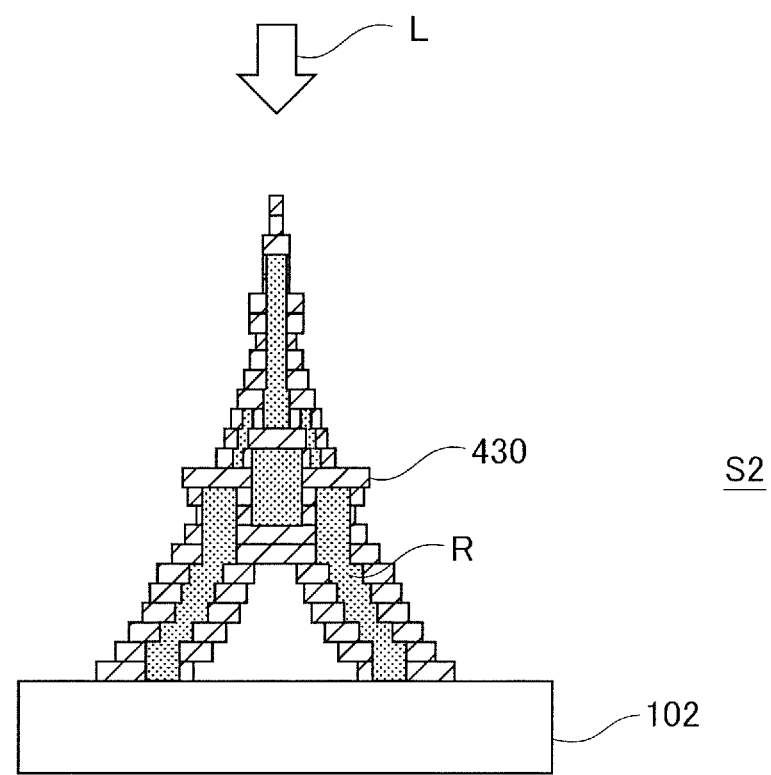
FIG. 8 is an explanatory view of a method for manufacturing a three-dimensional shaped object according to a fourth embodiment.

FIG. 8 is an explanatory view of step S2 according to a fourth embodiment. In the fourth embodiment, in step S1, the photocuring resin R is cured and the whole lamination portion 430 formed of the cured object is formed, by which all the plurality of regions retaining the uncured or semi-cured photocuring resin R are defined. Then, in step S2, the uncured or semi-cured photocuring resin R positioned at the plurality of regions is cured collectively, and the plurality of seamless portions are formed collectively.

In this case, the cured object H as a whole must be cured collectively in a state where the object H is drawn out of the photocuring resin R in liquid state in the vessel 101, i.e., pool, so that the photocuring resin R positioned at each region must be prevented from falling from each region. In the example of FIG. 8, since the respective regions are formed on the inner side of the cured object H, the photocuring resin R positioned at each region will not fall even if the lamination portion 430 is drawn out from the vessel 101. Further, if the photocuring resin R positioned at a region is set to semi-cured state, the photocuring resin R will not fall from the region even if the region constitutes an outer surface of the object. By collectively curing the photocuring resin R positioned at each region, the time required to manufacture the three-dimensional shaped object W can be shortened. In the curing step of the present embodiment, the first, second and third portions are cured after the $n+1^{th}$ layer forming step.

One method for collectively curing the photocuring resin R in a plurality of regions is to increase the light quantity, that is, increase the intensity of light, compared to the intensity of light for forming the lamination portion 430, and irradiate light to the whole object. Further, if photocuring resin R is also cured by heating, it is possible to heat the whole lamination portion 430 and the photocuring resin R retained therein. In that case, a heat source should be provided instead of the spot light source 112 as curing unit.

Fifth Embodiment

Figure 9:
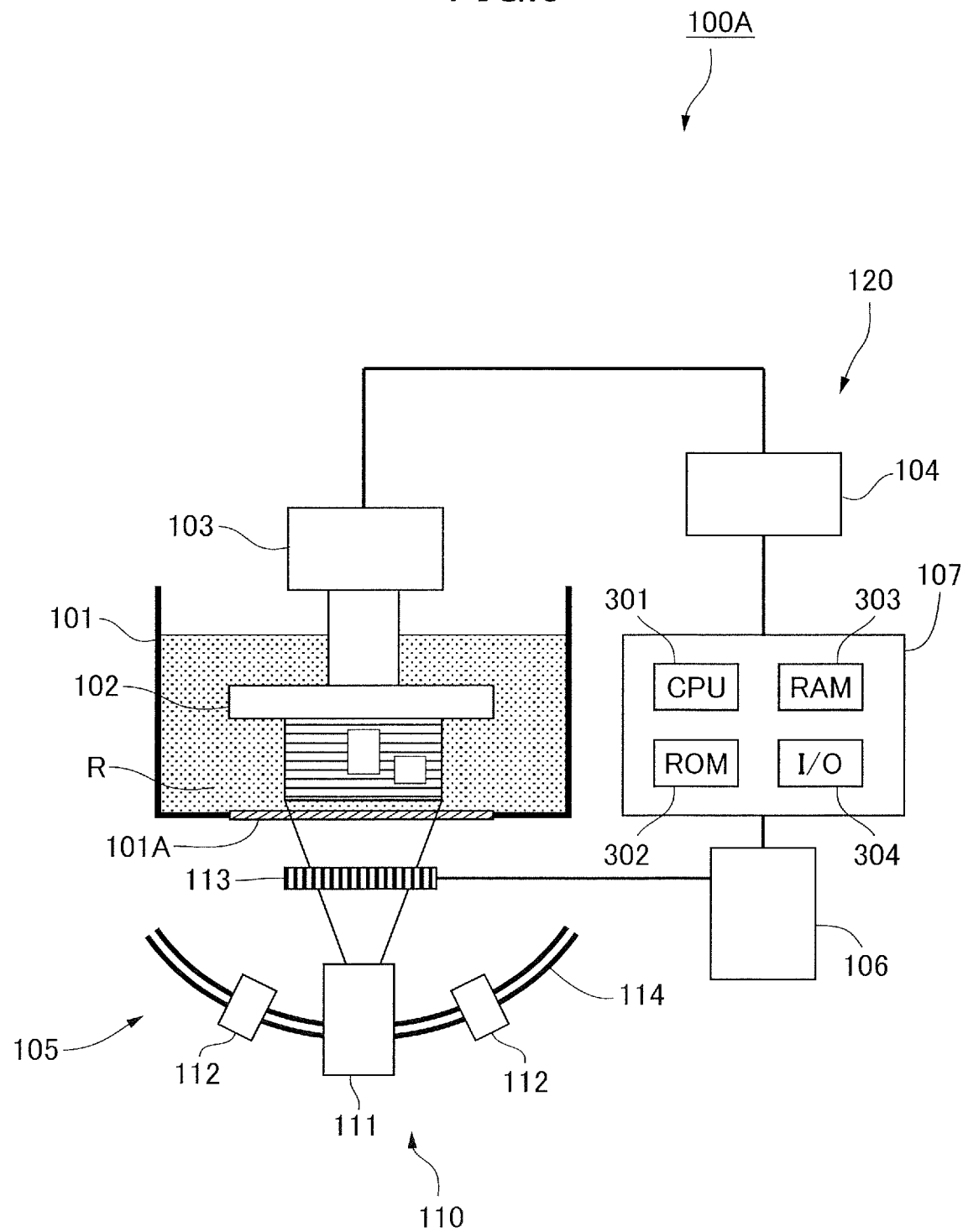
FIG. 9 is a simplified diagram illustrating an additive manufacturing apparatus according to a fifth embodiment.

Now, a fifth embodiment will be described. The first to fourth embodiments have been described based on a subsidence system where the additive manufacturing apparatus 100 lowers the printing table 102 to shape the shaping material, but the present invention is not restricted thereto. FIG. 9 is a simplified diagram illustrating an additive manufacturing apparatus 100A according to the fifth embodiment. The additive manufacturing apparatus 100A according to the fifth embodiment is a suspension type apparatus in which the printing table 102 is lifted to shape a shaping material. In FIG. 9, configurations similar to the additive manufacturing apparatus 100 illustrated in FIG. 1 are denoted with the same reference numbers, and detailed descriptions thereof are omitted.

Since the additive manufacturing apparatus 100A adopts a suspension type system, a transmission window 101A through which ultraviolet light is transmitted is arranged below the vessel 101, and an exposure unit 105 is arranged below the vessel 101. In a state where shaping corresponding to one layer is performed, the printing table 102 is lifted for a distance corresponding to one layer with respect to the transmission window 101A. Thereby, the three-dimensional shaped object is shaped in a manner suspended from the printing table 102. Even if such suspension type additive manufacturing apparatus 100A is adopted, the three-dimensional shaped object can be manufactured according to the first to fourth embodiments described above.

EXAMPLE

Now, examples 1 through 3 will be described with reference to the drawings.

Example 1

Figure 10A:
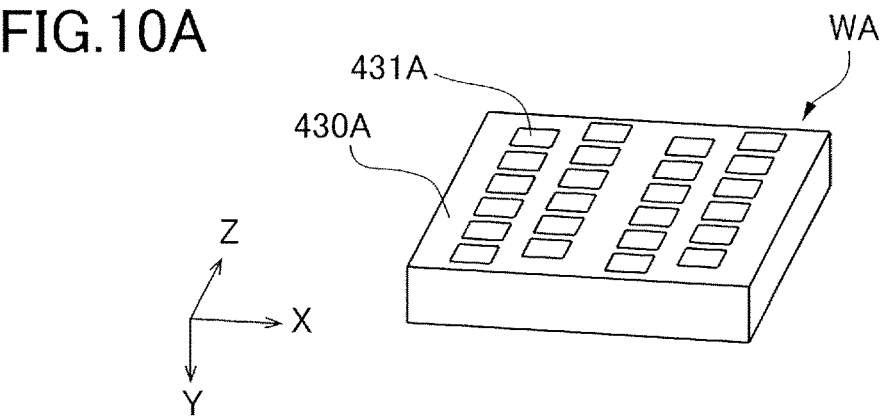
FIG. 10A is a perspective view of a test piece manufactured according to the first embodiment.
Figure 10B:
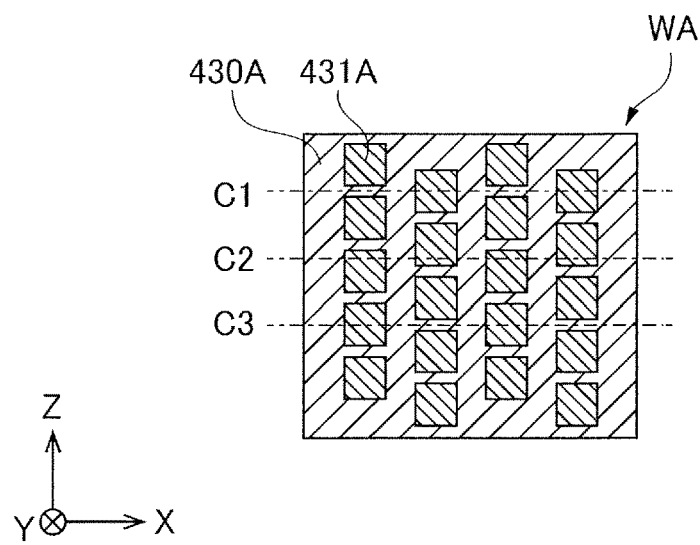
FIG. 10B is a plan view of the test piece according to the first embodiment.
Figure 10C:
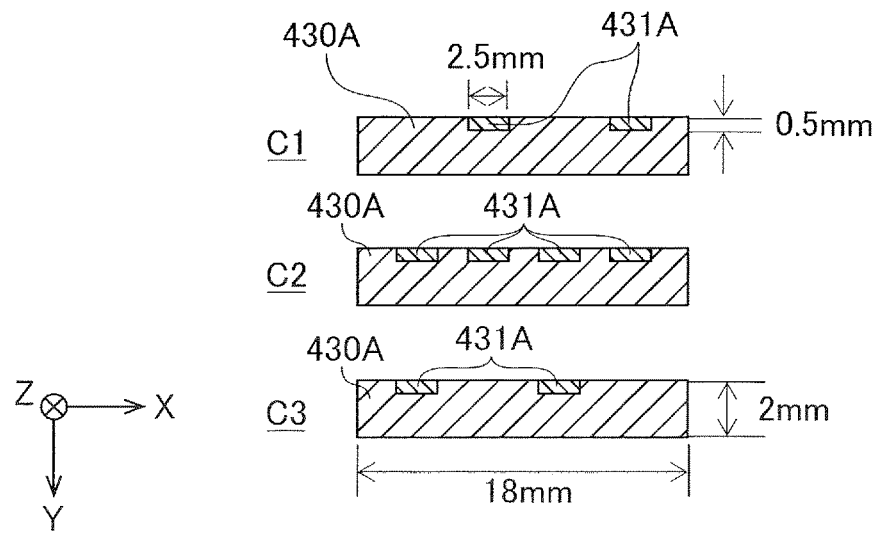
FIG. 10C is a cross-sectional view of the test piece according to the first embodiment.

FIG. 10A is a perspective view of test piece WA manufactured according to example 1, FIG. 10B is a plan view of test piece WA, and FIG. 10C is a cross-sectional view of test piece WA. Test piece WA was formed in a thin plate shape to measure a tensile strength of the test piece WA. MR-FG12, which is a photocuring resin material manufactured by Mutoh Industries Ltd., was used as shaping material of test piece WA. The test piece WA was manufactured using the additive manufacturing apparatus 100A illustrated in FIG. 8.

In step S1, wavelength of ultraviolet light emitted from the light source 111 was set to 405 [nm], intensity of ultraviolet light was set to 10 [mW/cm²], irradiation was performed for 1 [sec] from below, and the layers were laminated while pulling up the table to form a lamination portion 430A. A thickness of one layer of the lamination portion 430A was set to 30 [μm], and the printing table 102 was pulled up for 30 [μm] after laminating each layer to perform shaping. In step S1, ultraviolet light with an irradiation intensity of 10[%], that is, 1 [mW/cm²], was irradiated to the photocuring resin in liquid state before forming a seamless portion 431A, and the resin was semi-cured.

In step S2, intensity of ultraviolet light irradiated from the spot light source 112 to the photocuring resin in semi-cured state was set to 200[%], that is, 20 [mW/cm²], and photocuring resin corresponding to six layers (180 [μm]) was cured collectively to form the seamless portion 431A. Further, in example 1, the respective seamless portions 431A were formed individually.

As illustrated in FIG. 10C, the seamless portions 431A were alternately arranged in the lamination direction, i.e., Z direction, so that two or more seamless portions 431A are provided in every cross-section. That is, test piece WA was formed so that two seamless portions 431A are provided in cross-section C1, four seamless portions 431A are provided in cross-section C2, and two seamless portions 431A are provided in cross-section C3.

An outer shape of the whole test piece WA was formed in a rectangular parallelepiped shape, with a Y-direction thickness of 2 [mm], an X-direction width of 18 [mm] and a Z-direction length of 35 [mm]. A Y-direction thickness of the seamless portion 431A was set to 0.5 [mm]. For comparison, although not shown, a test piece having a similar outer shape but without seamless portions was also manufactured using the additive manufacturing apparatus 100A.

Tensile testing in the Z direction was performed for the test piece WA manufactured according to example 1 and the test piece of a comparative example not shown. An electromechanical universal testing machine 5582 manufactured by INSTRON was used as testing machine, and the test was performed at a speed of 0.2 [mm/sec].

Breaking strength of test piece not shown of the comparative example without the seamless portion was 5.53 [MPa]. Meanwhile, breaking strength of test piece WA according to example 1 was 6.41 [MPa]. Based on this test result, it has been confirmed that breaking strength in the Z direction of the test piece WA according to example 1 was improved by approximately 16[%] from the comparative example.

Example 2

Figure 11:
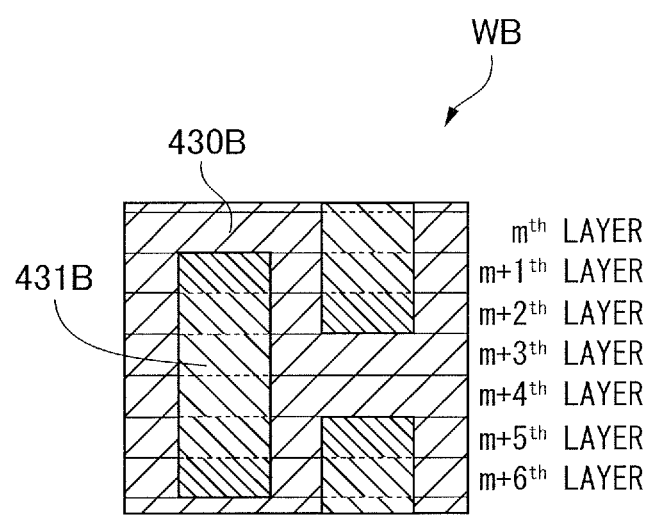
FIG. 11 is a plan view illustrating one portion of a test piece manufactured according to a second embodiment.

FIG. 11 is a plan view illustrating a portion of a test piece WB manufactured according to example 2. In example 2, the outer shape and positional relationships of seamless portions 431B are similar to example 1, but a method of exposure of the seamless portions 431B was varied when manufacturing the test piece WB.

FIG. 11 is described focusing on the seamless portion 431B illustrated on a left side. In step S1, after forming an $m^{th}$ layer of lamination portion 430B, an $(m+1)^{th}$ layer of lamination portion 430B was formed. The intensity of ultraviolet light irradiated to form the lamination portion 430B was set to 10 [mW/cm²]. In this state, ultraviolet light with an intensity of 50[%], that is, 5 [mW/cm²], was irradiated to the photocuring resin in the region defined by the lamination portion 430B, and the photocuring resin was semi-cured. In the subsequent $(m+2)^{th}$ layer, ultraviolet light was irradiated with an intensity of 3 [mW/cm²], and in the following $(m+3)^{th}$ and $(m+4)^{th}$ layers, ultraviolet light with an intensity of 1 [mW/cm²] was irradiated and the photocuring resin was semi-cured. In the following $(m+5)^{th}$ layer, the intensity was increased again and ultraviolet light with an intensity of 3 [mW/cm²] was irradiated similar to the $(m+2)^{th}$ layer, and in the $(m+6)^{th}$ layer, ultraviolet light was irradiated with an intensity of 5 [mW/cm²] similar to the $(m+1)^{th}$ layer, and the photocuring resin was semi-cured.

In step S2, the intensity of ultraviolet light irradiated from the spot light source 112 to the photocuring resin in semi-cured state is set to 200[%], that is, 20 [mW/cm²], and photocuring resin corresponding to six layers (180 [μm]) was cured collectively to form the seamless portions 431B.

Tensile testing similar to example 1 was performed, and according to the test result, the breaking strength of test piece WB was 6.47 [MPa]. Based on this test result, it has been confirmed that breaking strength in the Z direction of the test piece WB according to example 2 was improved by approximately 17[%] from the comparative example. It has been confirmed that breaking strength was improved compared to example 1. It has been confirmed that by varying the exposure intensity and varying the intensity of light irradiated to the lamination portions 430B for semi-curing the photocuring resin at the seamless portions 431B toward the lamination portions 431B in stepped configuration, the whole component may be integrated and the rigidity of the shaped object may be enhanced further.

According to the test described above, the irradiation intensity of ultraviolet light has been changed in stepped configuration to a layer thickness corresponding to each layer of the lamination portions 430B, but the thickness of the layer of photocuring resin being semi-cured in stepped configuration can be set arbitrarily. For example, the irradiation intensity of ultraviolet light can be varied in stepped configuration every 15 [μm], which is half of the layer thickness of 30 [μm]. Further, the test has been performed of a case where the irradiation intensity was varied in stepped configuration in the Z direction, but the irradiation intensity of ultraviolet light may also be varied successively in the Z direction. In either case where the intensity of ultraviolet light is varied in stepped configuration or successively, the rigidity of the shaped object was improved.

Example 3

Figure 12A:
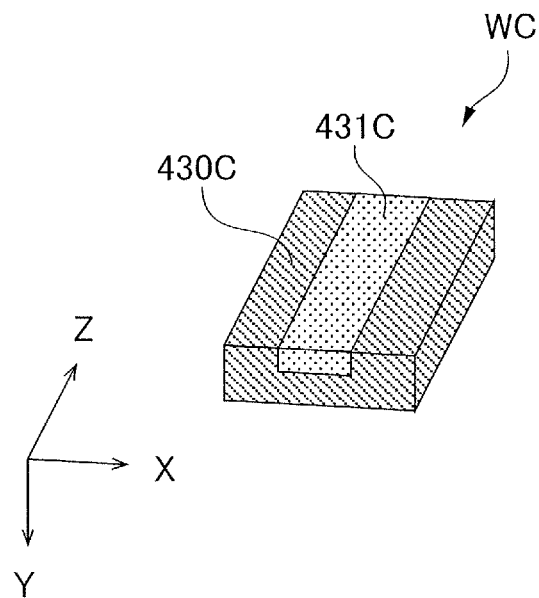
FIG. 12A is a perspective view of a test piece manufactured according to a third embodiment.
Figure 12B:
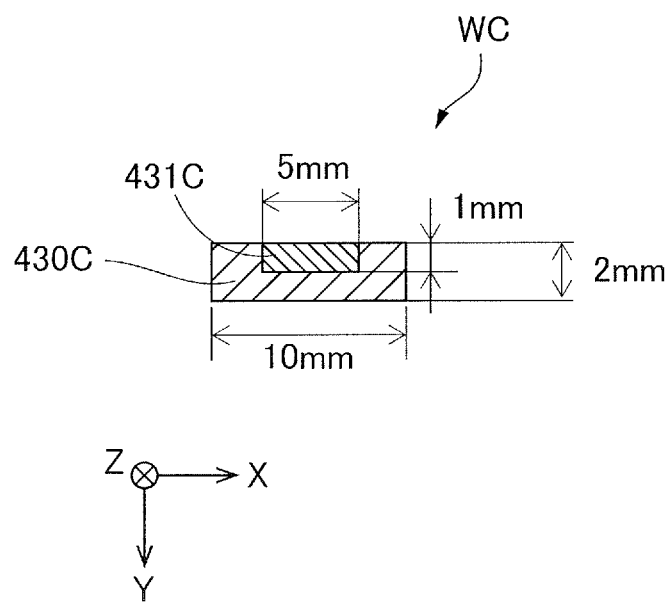
FIG. 12B is a cross-sectional view of the test piece manufactured according to the third embodiment.

FIG. 12A is a perspective view of test piece WC manufactured according to example 3, and FIG. 12B is a cross-sectional view of test piece WC manufactured according to example 3.

In examples 1 and 2, photocuring resin retained at areas corresponding to the respective seamless portions were individually cured while lifting the lamination portions 430A and 430B, and respective seamless portions 431A and 431B were formed individually. In example 3, a test was performed assuming that a plurality of seamless portions 431C are collectively cured integrally after drawing out the lamination portion 430C.

An outer shape of the whole test piece WC was formed in a rectangular parallelepiped shape, with an X-direction width of 10 [mm], a Y-direction thickness of 2 [mm] and a Z-direction length of 20 [mm]. In the test piece WC, one seamless portion 431C was formed, and each layer was exposed to irradiation of 2 [mW/cm²] to realize a semi-cured state. Then, after completely drawing out the test piece WC, ultraviolet light was irradiated for 60 [sec] with an intensity of 20 [mW/cm²] to the whole test piece WC, and the photocuring resin in a semi-cured state was cured. Similar to examples 1 and 2, the seamless portion 431C is exposed on the surface, but as illustrated in FIG. 12B, the thickness of the seamless portion 431C was increased, and the Y-direction thickness was set to 1 [mm] and the X-direction width was set to 5 [mm]. In consideration of the advancement of curing of resin by dark reaction even if light having a weak intensity is irradiated and reaction rate enabling to maintain the outer shape of the test piece WC, an amount of exposure required to form the seamless portion 431C is determined.

In a state where tensile testing similar to example 1 was performed, the breaking strength of test piece WC was 7.96 [MPa]. Therefore, it was confirmed that even if the lamination portion 430C was cured after drawing out of the container storing photocuring resin in a liquid state, it was possible to form the seamless portion 431C and to ensure the rigidity of the shaped object. Compared to the test piece of the comparative example compared to example 1, it was confirmed that the breaking strength was improved by approximately 44[%].

The present invention is not restricted to the embodiments described above, and it may be modified in various ways within the scope of the present invention. The effects described in the embodiments are mere lists of most preferable effects that has been realized by the present invention, and the effects of the present invention are not restricted to those described in the embodiments.

The exposure unit 105 including the light source 111, the spot light source 112 and the liquid crystal panel 113 has been described as an example of the curing unit, but the curing unit is not restricted thereto. For example, the spot light source 112 can be omitted if one light source 111 is sufficient according to the exposure unit. Further, the curing unit may be an exposure unit including a laser light source, a lens, a scanner and so on. The photocuring resin R may be cured by laser beam scanning the photocuring resin R on the printing table 102 based on an exposure pattern to constitute slice data. Further, for example, an exposure unit including a DMD element and a light source may be used as a curing unit.

The shaping of the three-dimensional shaped object according to the present invention preferably adopts an optical shaping method that uses photocuring resin, but the present invention may also be applied to a power laminating method, an FDM method and so on.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2017-235599, filed Dec. 7, 2017, and 2018-211542, filed Nov. 9, 2018 which are hereby incorporated by reference herein in their entirety.

What is claimed is:

1. An additive manufacturing apparatus comprising:
a vessel configured to store photocuring material;
an object supporting portion;
a light irradiation unit configured to irradiate the photocuring material with light for curing the photocuring material; and
a controller configured to control the object supporting portion and the light irradiation unit,
wherein slice data of a three-dimensional shaped object for forming the three-dimensional shaped object layer by layer include slice data of an n−1 layer, an $n^{th}$ layer, and an n+1 layer, and the controller is configured to distinguish a region in each of the slice data of the n−1 layer, the $n^{th}$ layer, and the n+1 layer into a first region and a second region,
wherein a second region in slice data of the $n^{th}$ layer and a second region in slice data of the n−1 layer include overlapping portions that overlap each other in a lamination direction, and a second region in slice data of the n+1 layer at least partially overlaps the overlapping portions in the lamination direction,
wherein according to the slice data in which the first region and the second region are distinguished, the controller is configured to have the additive manufacturing apparatus execute:
an n−1 layer forming process of forming an uncured layer of the photocuring material for forming an n−1 layer by controlling positioning of the molding support member and irradiating a portion, corresponding to a first region in the slice data of the n−1 layer, of the uncured layer with light to form a cured portion of the n−1 layer;
an $n^{th}$ layer forming process of forming an uncured layer of the photocuring material for forming an $n^{th}$ layer by controlling positioning of the molding support member and irradiating a portion, corresponding to a first region in the slice data of the $n^{th}$ layer, of the uncured layer with light to form a cured portion of the $n^{th}$ layer;
an n+1 layer forming process of forming an uncured layer of the photocuring material for forming an n+1 layer by controlling positioning of the molding support member and irradiating a portion, corresponding to the first region in the slice data of the n+1 layer, of the uncured layer with light to form a cured portion of the n+1 layer; and a process of controlling the light irradiation unit to irradiate simultaneously a portion corresponding to the second region in the slice data of the n−1 layer, a portion corresponding to the second region in the slice data of the $n^{th}$ layer, and a portion corresponding to the second region in the slice data of the n+1 layer with light after the n+1 layer forming process, wherein n is a natural number of 2 or greater, and wherein a part of the second region in the slice data of the $n^{th}$ layer overlaps at least one of the first region in the slice data of the n−1 layer and the first region in the slice data of the n+1 layer in the lamination direction.

2. The additive manufacturing apparatus according to claim 1, wherein the second region is surrounded by the first region in each of the slice data of the n−1 layer, the $n^{th}$ layer, and the n+1 layer.

3. The additive manufacturing apparatus according to claim 1, wherein an area of the overlapping portion in the slice data of the n−1 layer is 25% to 100% of an area of the first region in the slice data of the n−1 layer.

4. The additive manufacturing apparatus according to claim 1, wherein the photocuring material is a photocuring resin in a liquid state.

5. The additive manufacturing apparatus according to claim 1, wherein in the $n^{th}$ layer forming process, the controller is configured to control the light irradiation unit to irradiate the portion corresponding to the second region in the slice data of the $n^{th}$ layer with light having a weaker intensity than an intensity of the light for the portion corresponding to the first region in the slice data of the $n^{th}$ layer.

6. The additive manufacturing apparatus according to claim 5, wherein the controller is configured to control the light irradiation unit so that an intensity of the light irradiated on the portion corresponding to the second region in the slice data of the $n^{th}$ layer increases stepwise or successively toward the portion corresponding to the first region in the slice data of the $n^{th}$ layer.

7. The additive manufacturing apparatus according to claim 1, wherein the controller is configured to control the light irradiation unit to irradiate the portions corresponding to the second regions in the slice data of the n−1 layer, the $n^{th}$ layer, and the n+1 layer with light having a stronger intensity than an intensity of the light irradiated to the portion corresponding to the first region in the slice data of the n−1 layer in the n−1 layer forming process, the light irradiated to the portion corresponding to the first region in the slice data of the $n^{th}$ layer in the $n^{th}$ layer forming process, and the light irradiated to the portion corresponding to the first region in the slice data of the n+1 layer in the n+1 layer forming process.

\* \* \* \* \*